United States Patent
Babazaki et al.

(10) Patent No.: US 11,935,277 B2
(45) Date of Patent: Mar. 19, 2024

(54) GENERATION METHOD, TRAINING DATA GENERATION DEVICE AND PROGRAM

(71) Applicant: NEC Corporation, Tokyo (JP)

(72) Inventors: Yasunori Babazaki, Tokyo (JP); Jun Piao, Tokyo (JP); Hideaki Sato, Tokyo (JP); Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 17/436,711

(22) PCT Filed: Mar. 14, 2019

(86) PCT No.: PCT/JP2019/010563
§ 371 (c)(1),
(2) Date: Sep. 7, 2021

(87) PCT Pub. No.: WO2020/183705
PCT Pub. Date: Sep. 17, 2020

(65) Prior Publication Data
US 2022/0172460 A1 Jun. 2, 2022

(51) Int. Cl.
*G06V 10/774* (2022.01)
*G06V 10/778* (2022.01)

(52) U.S. Cl.
CPC ...... *G06V 10/7747* (2022.01); *G06V 10/7788* (2022.01)

(58) Field of Classification Search
CPC ........... G06V 10/7747; G06V 10/7788; G06V 10/80; G06V 10/803; G06V 10/809; G06V 30/1916; G06V 30/196; G06V 2201/10
See application file for complete search history.

(56) References Cited

U.S. PATENT DOCUMENTS 8,538,139 B2 * 9/2013 Kameyama ........... G06T 3/4053
382/254
8,548,259 B2 * 10/2013 Tuganbaev ........... G06F 18/254
382/161

(Continued)

FOREIGN PATENT DOCUMENTS

JP 2015-176175 A 10/2015
JP 2018-055195 A 4/2018

OTHER PUBLICATIONS

International Search Report for PCT Application No. PCT/JP2019/010563, dated May 21, 2019.

*Primary Examiner* — Manav Seth
(74) *Attorney, Agent, or Firm* — Sughrue Mion, PLLC

(57) ABSTRACT

A training data generation device performs the processes of: acquiring first correct answer data that is correct answer data with respect to each training image of a training image group, the training image group including plural training images to be given the correct answer data, the training image group being divided into plural image subgroups, the first correct answer data being generated in a different situation for each of the plural image subgroups; generating a discriminator with respect to the each of the plural image subgroups, the discriminator being learned based on the each of the plural image subgroups and the first correct answer data corresponding to the each of the plural image subgroups; acquiring a discrimination result outputted by the discriminator for each of the plural training images by inputting the each of the plural training images to the discriminator which is generated based on at least one image subgroup other than an image subgroup to which the each of the training images belongs; and generating second correct answer data for the each of the plural training images based on the discrimination result and the first correct answer data.

19 Claims, 12 Drawing Sheets

(56) References Cited

U.S. PATENT DOCUMENTS

| | | | |
|---|---|---|---|
| 8,660,371 B2* | 2/2014 | Tuganbaev | G06F 18/254 |
| | | | 382/160 |
| 8,983,179 B1* | 3/2015 | Yu | G06T 7/11 |
| | | | 700/47 |
| 9,552,536 B2* | 1/2017 | Ando | G06F 18/217 |
| 10,049,308 B1* | 8/2018 | Dhua | G06T 11/60 |
| 10,521,691 B2* | 12/2019 | Najibikohnehshahri | |
| | | | G06T 7/11 |
| 10,552,663 B2* | 2/2020 | Smith | G06V 20/698 |
| 11,042,976 B2* | 6/2021 | He | G06T 7/001 |
| 11,514,307 B2* | 11/2022 | Kawaguchi | G06F 18/2431 |
| 2011/0176725 A1* | 7/2011 | Homma | G06F 18/214 |
| | | | 382/159 |
| 2014/0029839 A1* | 1/2014 | Mensink | G06V 10/764 |
| | | | 382/224 |
| 2018/0089537 A1 | 3/2018 | Tsunoda et al. | |
| 2021/0304363 A1* | 9/2021 | Makihira | G16H 50/70 |
| 2022/0130135 A1* | 4/2022 | Piao | G06V 10/776 |
| 2022/0375193 A1* | 11/2022 | Najibikohnehshahri | |
| | | | G06N 3/084 |
| 2023/0019364 A1* | 1/2023 | Liang | G06F 18/214 |
| 2023/0351607 A1* | 11/2023 | Lu | G06T 7/62 |

* cited by examiner

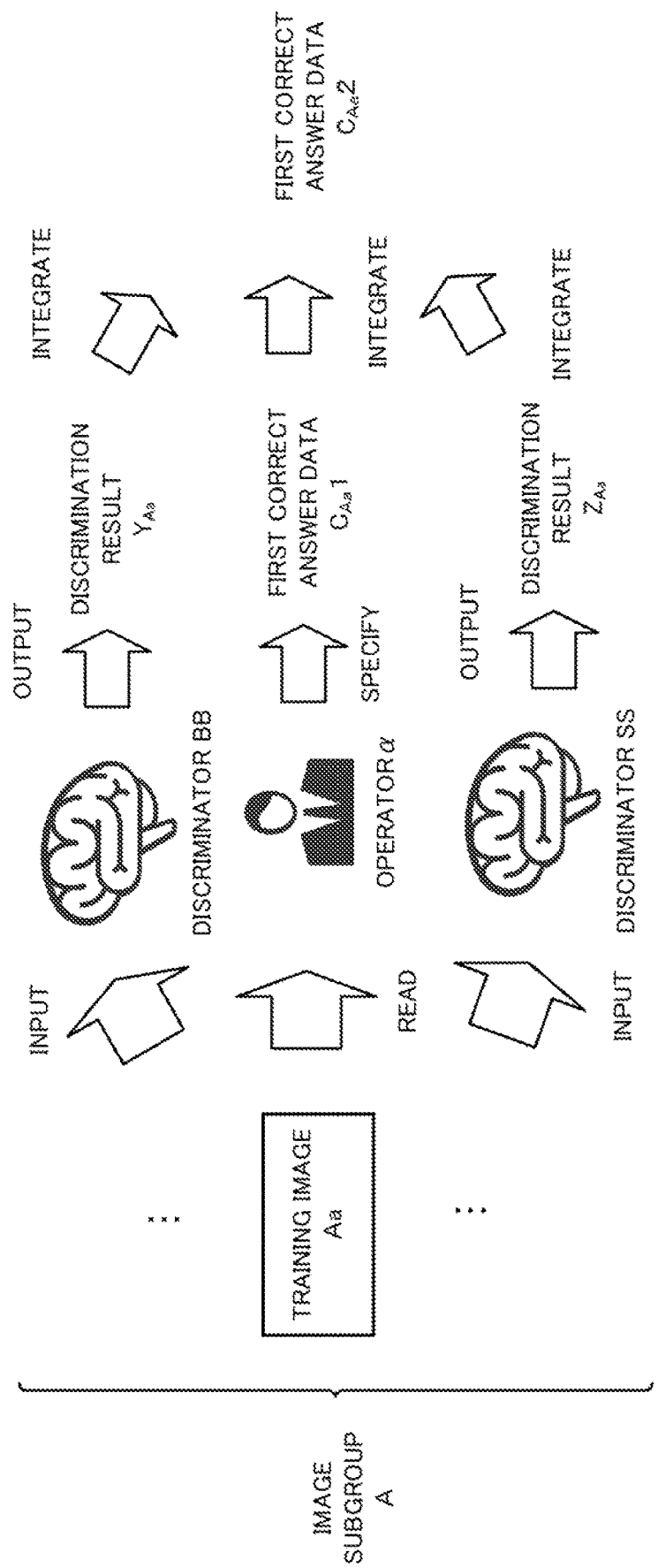

GENERATION METHOD, TRAINING DATA GENERATION DEVICE AND PROGRAM

This application is a National Stage Entry of PCT/JP2019/010563 filed on Mar. 14, 2019, the contents of all of which are incorporated herein by reference, in their entirety.

TECHNICAL FIELD

The present invention relates to a technical field of a generation method, a training data generation device and a program for generating correct answer data necessary for machine learning.

BACKGROUND ART

An example of a method of generating training data for use in learning is disclosed in Patent Literature 1. Patent Literature 1 discloses a method of learning plural discriminators corresponding to plural subsets of training data set including images and sensor information, wherein each of the subsets includes a different set of images and sensor information.

PRIOR ART DOCUMENTS

Patent Literature

Patent Literature 1: JP 2018-055195A

SUMMARY OF THE INVENTION

Problem to be Solved by the Invention

Generally, since the accuracy of the discriminator obtained by learning largely depends on the number of training data used for learning and the homogeneity of the quality thereof, it is necessary to acquire many training data having uniform homogeneity. On the other hand, when the correct answer data indicating the correct answer for the training image is generated based on manual annotation method, the work time becomes long. As a result, it is necessary to perform the work by sharing with multiple workers or to perform the work by dividing into multiple times. In this case, the variation in the quality of the generated correct answer data will occur. Patent Literature 1 is silent on a method of suppressing the variation in the quality of the correct answer data in the case of generating correct answer data based on the manual method.

In view of the above-described issues, it is therefore an example object of the present disclosure to provide a generation method, a training data generation device and a program capable of suppressing the variation in the quality of the correct answer data.

Means for Solving the Problem

In one mode of the generation method, there is provided a generation method executed by a training data generation device, including: acquiring first correct answer data that is correct answer data with respect to each training image of a training image group, the training image group including plural training images to be given the correct answer data, the training image group being divided into plural image subgroups, the first correct answer data being generated in a different situation for each of the plural image subgroups; generating a discriminator with respect to the each of the plural image subgroups, the discriminator being learned based on the each of the plural image subgroups and the first correct answer data corresponding to the each of the plural image subgroups; acquiring a discrimination result outputted by the discriminator for each of the plural training images by inputting the each of the plural training images to the discriminator which is generated based on at least one image subgroup other than an image subgroup to which the each of the training images belongs; and generating second correct answer data for the each of the plural training images based on the discrimination result and the first correct answer data.

In one mode of the training data generation device, there is provided a training data generation device including: a first correct answer data acquisition unit configured to acquire first correct answer data that is correct answer data with respect to each training image of a training image group, the training image group including plural training images to be given the correct answer data, the training image group being divided into plural image subgroups, the first correct answer data being generated in a different situation for each of the plural image subgroups; a learning unit configured to generate a discriminator with respect to the each of the plural image subgroups, the discriminator being learned based on the each of the plural image subgroups and the first correct answer data corresponding to the each of the plural image subgroups; a discrimination unit configured to acquire a discrimination result outputted by the discriminator for each of the plural training images by inputting the each of the plural training images to the discriminator which is generated based on at least one image subgroup other than an image subgroup to which the each of the training images belongs; and a second correct answer data generation unit configured to generate second correct answer data for the each of the plural training images based on the discrimination result and the first correct answer data.

In one mode of the discrimination device, there is provided a program executed by a computer, the program causing the computer to function as: a first correct answer data acquisition unit configured to acquire first correct answer data that is correct answer data with respect to each training image of a training image group, the training image group including plural training images to be given the correct answer data, the training image group being divided into plural image subgroups, the first correct answer data being generated in a different situation for each of the plural image subgroups; a learning unit configured to generate a discriminator with respect to the each of the plural image subgroups, the discriminator being learned based on the each of the plural image subgroups and the first correct answer data corresponding to the each of the plural image subgroups; a discrimination unit configured to acquire a discrimination result outputted by the discriminator for each of the plural training images by inputting the each of the plural training images to the discriminator which is generated based on at least one image subgroup other than an image subgroup to which the each of the training images belongs; and a second correct answer data generation unit configured to generate second correct answer data for the each of the plural training images based on the discrimination result and the first correct answer data.

Effect of the Invention

An example advantage according to the present invention is to generate second correct answer data in which variation of quality is suitably suppressed.

BRIEF DESCRIPTION OF THE DRAWINGS

FIG. 10 illustrates a generation process of the second correct answer data for the training image based on a first modification.

DESCRIPTION OF EXAMPLE EMBODIMENTS

Hereinafter, an example embodiment of a generation method, a training data generation device, and a program will be described with reference to the drawings.

Overall Configuration

Figure 1:
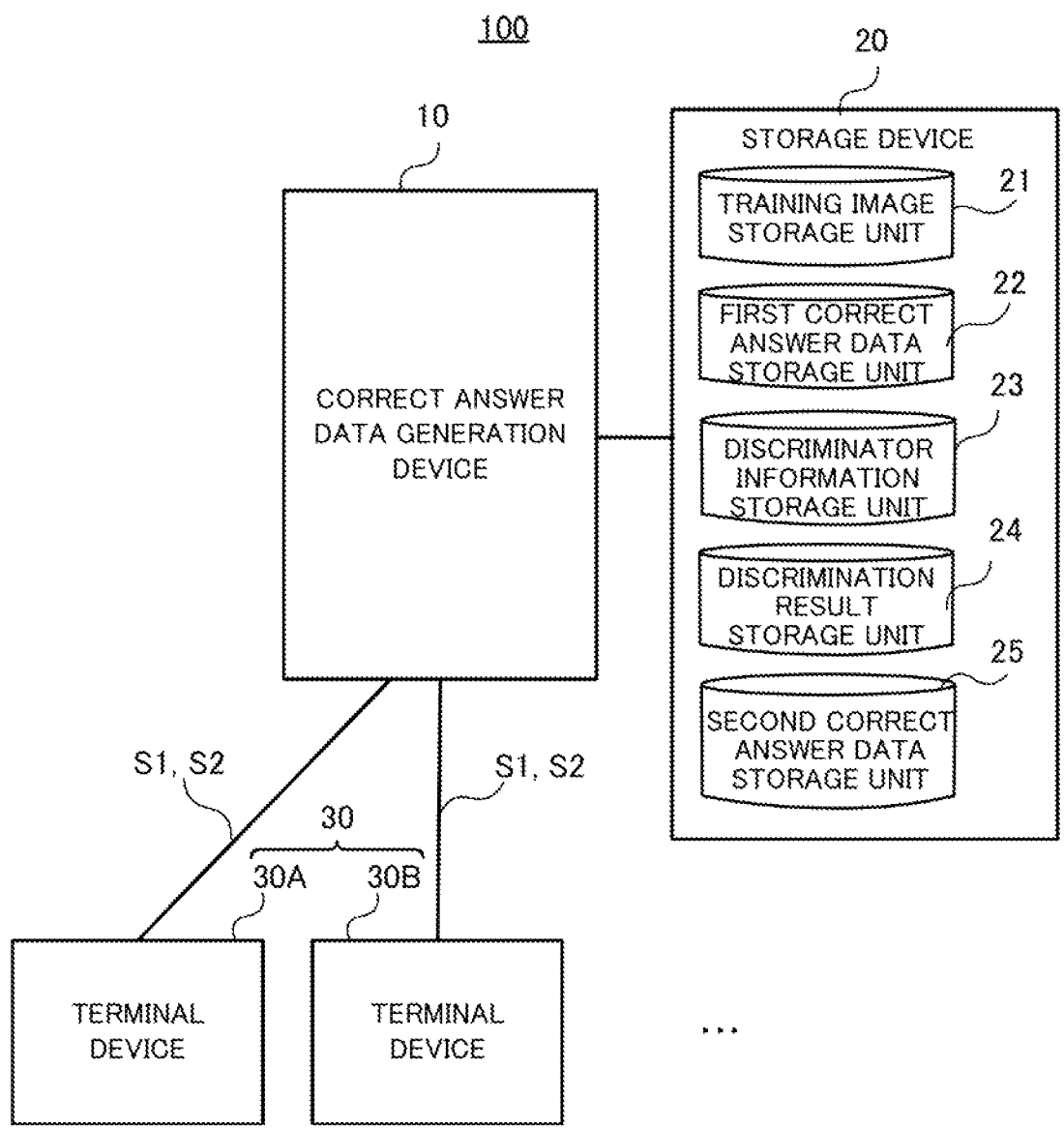
FIG. 1 illustrates a schematic configuration of a training data generation system in an example embodiment.

FIG. 1 illustrates a schematic configuration of a training data generation system 100 according to the present example embodiment. The training data generation system 100 suitably generates correct answer data that is a part of the training data necessary for training of the learning model. Here, it is assumed that the "learning model" is an arbitrary calculation model that outputs, when an input image is inputted thereto, information corresponding to the input image. In addition, "training data" refers to a set (data set) of a training image, which is an image inputted to the learning model, and correct answer data, which indicates a correct answer when the training image is inputted to the learning model.

The training data generation system 100 includes a training data generation device 10, a storage device 20, and plural terminal devices 30 (30A, 30B, . . . ).

The training data generation device 10 generates correct answer data for the training image stored in the training image storage unit 21 of the storage device 20, which will be described later. In this case, the training data generation device 10 transmits, to each terminal device 30, a request signal "S1" of the correct answer data including an image group (also referred to as "image subgroup") obtained by dividing the training image group that is a target to be given correct answer data. Further, the training data generation device 10 receives a response signal "S2", as the response of the request signal S1 from the terminal device 30, which includes correct answer data (also referred to as "first correct answer data C1") generated by the terminal device 30 from the image subgroup. Then, the training data generation device 10 generates correct answer data (also referred to as "second correct answer data C2") that is the first correct answer data C1 corrected based on the first correct answer data C1 included in the response signal S2 and the discrimination result by the learning model, which is learned based on the training data including the first correct answer data C1.

The terminal device 30 (30A, 30B, . . . ) is an information processing device for performing an operation (also referred to as a "correct answer annotation operation") in which an operator specifies, through the user input, a position or an area, in the training image, of a target (also referred to as "annotation target") to be given the correct answer. In the present example embodiment, as an example, it is assumed that the terminal device 30 is provided for each operator α nd that there are plural operators and plural terminal devices 30. When receiving the request signal S1 transmitted from the training data generation device 10, the terminal device 30 generates the first correct answer data C1 based on the input of the operator for each training image included in the request signal S1. Then, the terminal device 30 transmits the response signal S2 including the generated first correct answer data to the training data generation device 10.

The storage device 20 is a device in which the training data generation device 10 can refer to and write data, and includes a training image storage unit 21, a first correct answer data storage unit 22, a discriminator information storage unit 23, a discrimination result storage unit 24 and a second correct answer data storage unit 25. The storage device 20 may be an external storage device such as a hard disk connected to or built into the training data generation device 10, may be a storage medium such as a flash memory, or may be a server device that performs data communication with the training data generation device 10. Further, the storage device 20 may include plural storage devices capable of data communication with the training data generation device 10. In this case, the plural storage devices which includes the storage device 20 decentrally store the training image storage unit 21, the first correct answer data storage unit 22, the discriminator information storage unit 23, the discrimination result storage unit 24 and the second correct answer data storage unit 25.

The training image storage unit 21 stores a training image group that is plural training images. Each training image contains an annotation target which is a target of annotation of the correct answer. The annotation target is a specific object or a specific part of the object. Examples of the annotation target include animals such as people or fish, plants, moving objects, features, instruments, or parts thereof. For example, a person is displayed in a training image in the case that the training image is used in a learning model for extracting a human area. In some embodiments, the training image is provided with metadata or the like for identifying the annotation object displayed on the training image.

The first correct answer data storage unit 22 stores the first correct answer data C1 included in the response signal S2 which the training data generation device 10 receives from each of the terminal devices 30.

The first correct answer data C1 is, for example, information indicating the position or area of the annotation target. For example, in a case that a training image is used in a learning model for extracting an area of specific feature points of a fish (e.g., a caudal fin, a back fin, a belly and a head), the first correct answer data C1 is information indicating the coordinate values of the specific feature points in the training image. In another example, in a case that the training image is used in the learning model for extracting the area of the person, the first correct answer data C1 is information for specifying the area of the person present in the training image. In this case, the first correct answer data C1 is, for example, information indicating the coordinate values of the two vertices (e.g., the upper right vertex and the lower left vertex) of the diagonal of the rectangular area when the area of the person is regarded as a rectangular area.

When the first correct answer data C1 indicates the area of the annotation target, the first correct answer data C1 may be a mask image indicating the area of the annotation target to be extracted from the training image (e.g., a binary image obtained by setting the pixel values of the annotation target to 1 and the other pixel values to 0). In another example, the first correct answer data C1 may be a reliability map showing the reliability for the position or area of the annotation target on a pixel-by-pixel basis.

The discriminator information storage unit 23 stores various information necessary for configuring a learning model (also referred to as "discriminator") learned to output, when the input image is inputted thereto, information on an area or a position of an annotation target. In the present example embodiment, as will be described later, the training data generation device 10 performs the training of the learning model with respect to each type of the annotation target and each of the image subgroups. Therefore, the discriminator information storage unit 23 stores parameter information to configure discriminators each generated through the training of the learning model for each of the image subgroups and for each type of the annotation target. For example, If the learning model is a neural network such as a convolutional neural network, the parameter information described above includes information such as a layer structure, a neuron structure of each layer, the number of filters and filter sizes in each layer, and the weights of each element of each filter.

The discrimination result storage unit 24 stores the discrimination results outputted by the discriminators when a training image is inputted to each of the discriminators, wherein each of the discriminators is generated through the training of the learning model by use of each image subgroup. The above-described discrimination results are data having the same format as the first correct answer data C1, and is information for specifying the position or the area of the annotation target. As will be described later, the discrimination result storage unit 24 stores the discrimination results each obtained by inputting, to each discriminator, the training image of the image subgroups other than the image subgroup used for the learning of the discriminator.

The second correct answer data storage unit 25 stores the second correct answer data C2 that is correct answer data obtained based on the first correct answer data C1 stored in the first correct answer data storage unit 22 and the discrimination data stored in the discrimination result storage unit 24. The second correct answer data storage unit 25 stores the second correct answer data C2 corresponding to each of the training images stored in the training image storage unit 21.

[Hardware Configuration]

Figure 2:
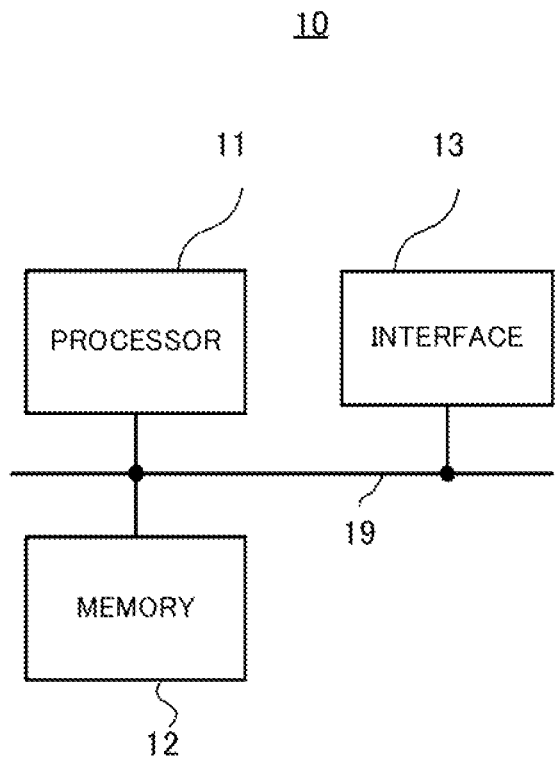
FIG. 2 illustrates an example of a hardware configuration of a training data generation device.

FIG. 2 illustrates an example of a hardware configuration of a training data generation device 10. The training data generation device 10 includes, as hardware, a processor 11, a memory 12 and an interface 13. The processor 11, the memory 12, and the interface 13 are connected via a data bus 19.

The processor 11 executes a predetermined process by executing a program stored in the memory 12. The processor 11 is a processor such as a CPU (Central Processing Unit) or a GPU (Graphics Processing Unit).

The memory 12 includes various memories such as a RAM (Random Access Memory), a ROM (Read Only Memory), and a flash memory. In addition, a program for executing a process related to learning executed by the training data generation device 10 is stored in the memory 12. The memory 12 is used as a work memory and temporarily stores information acquired from the storage device 20.

The interface 13 is a communication interface for wired or wireless transmission and reception of data to and from the storage device 20 and the terminal device 30 under the control of the processor 11, and includes a network adapter and the like. The training data generation device 10 and the storage device 20 may be connected by a cable or the like. In this case, the interface 13 may include a communication interface for performing data communication with the terminal device 30 and an interface conform to a USB or a SATA (Serial AT Attachment) or the like for exchanging data with the storage device 20.

Figure 3:
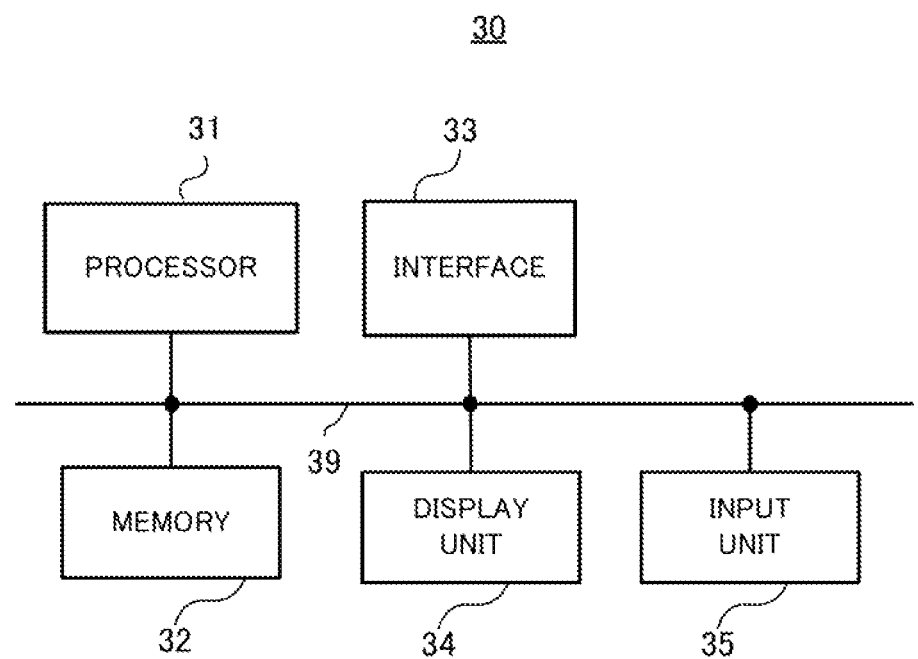
FIG. 3 illustrates an example of a hardware configuration of a terminal device.

FIG. 3 illustrates an example of a hardware configuration of the terminal device 30. The terminal device 30 includes, as hardware, a processor 31, a memory 32, an interface 33, a display unit 34, and an input unit 35. The processor 31, the memory 32, the interface 33, the display unit 34 and the input unit 35 are connected via a data bus 39.

The processor 31 executes a predetermined process by executing a program stored in the memory 32. The processor 31 is a processor such as a CPU, GPU or the like.

The memory 32 includes various memories such as a RAM, a ROM, and a flash memory. The memory 32 stores a program for executing a process related to learning performed by the terminal device 30. The memory 32 is used as a work memory and temporarily stores information acquired from the storage device 20 or the like. The interface 33 is a communication interface for wired or wireless transmission and reception of data to and from the training data generation device 10 under the control of the processor 31.

The display unit 34 is a display or the like, and displays a training image or the like included in the request signal S1 based on the control by the processor 31. The input unit 35 is an input device such as a mouse, a keyboard, a touch panel, or a voice input device, and receives an input for specifying a position or an area of an annotation target for the training image displayed on the display unit 34. On the basis of the input signal generated by the input unit 35, the processor 31 generates first correct answer data C1 indicating the position or the area of the annotation target specified by the operator.

The hardware configuration of the training data generation device 10 and the terminal device 30 is not limited to the configuration shown in FIGS. 2 and 3. For example, the training data generation device 10 may further include an input unit for receiving a user input and an output unit such as a display or a speaker. Similarly, the terminal device 30 may further include an output unit such as a speaker.

[Training Data Generation Process]

Next, a detailed description will be given of a training data generation process executed by the training data generation device 10.

(1) Functional Block

Figure 4:
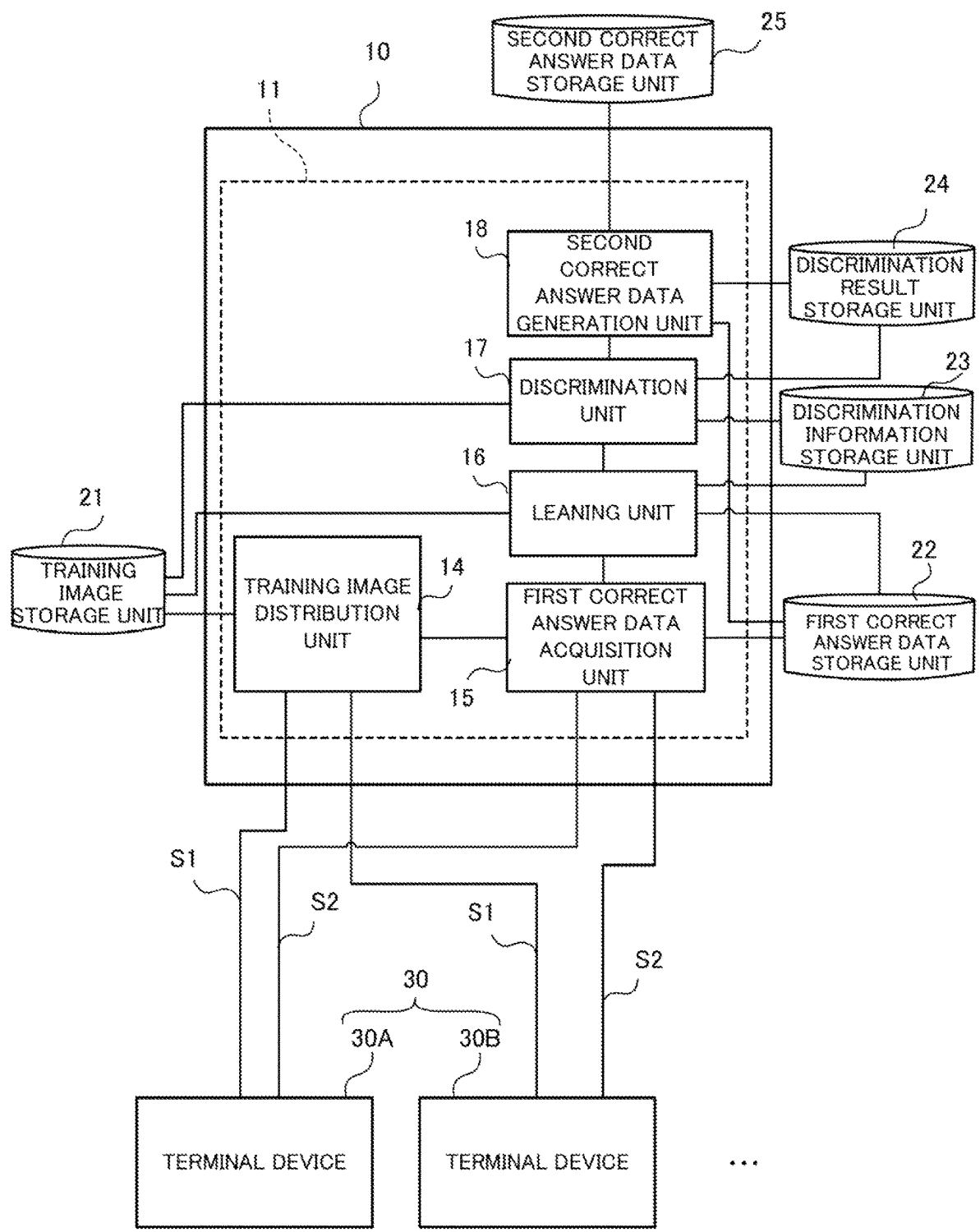
FIG. 4 illustrates a functional block diagram of a training data generation device.

FIG. 4 is a functional block diagram of the training data generation device 10. As shown in FIG. 4, the processor 11 of the training data generation device 10 functionally includes a training image distribution unit 14, a first correct answer data acquisition unit 15, a learning unit 16, a discrimination unit 17, and a second correct answer data generation unit 18.

The training image distribution unit 14 extracts the training image group that requires the provision of correct answer data from the training image storage unit 21 and divides the training image group so as to generate image subgroups the number of which is equal to the number of the terminal device 30. Hereafter, the number of the image subgroups generated by dividing the training image group is denoted as "N" (N is an integer equal to or larger than 2). Then, the training image distribution unit 14 transmits, to each terminal device 30 via the interface 13, the request signal S1 including an image subgroup different among the terminal devices 30 that are the transmission destinations.

In this case, preferably, the training image distribution unit 14 equally divides the training image group so that the number of images of each image subgroup with respect to each annotation target is substantially equal among the subgroups. In this case, for example, the training image distribution unit 14 classifies the training images according to the object that is the annotation target by referring to the identification information, which indicates the annotation target and is added to each training image as metadata, and divides the classified training image into N image subgroups.

The first correct answer data acquisition unit 15 receives the response signal S2 transmitted from each terminal device 30 via the interface 13, stores the first correct answer data C1 included in the received response signal S2 in the first correct answer data storage unit 22. Thereby, the first correct answer data storage unit 22 stores the first correct answer data C1 indicating the position or the area of the annotation target for each of the training images of each image subgroup transmitted to each terminal device 30 by the training image distribution unit 14. In this case, preferably, the first correct answer data C1 stored in the first correct answer data storage unit 22 includes the identification information indicative of the operator who performed the annotation operation for generating the first correct answer data C1 in association with the identification information indicative of the corresponding training image. The identification information indicative of the operator α nd the identification information inductive of the training image are included in the response signal S2 together with the first correct answer data C1, for example. The identification information indicative of the operator described above may be any information that can specify the operator directly or indirectly and it may be an ID assigned to the operator or any information to identify the terminal device 30 which the operator uses.

The learning unit 16 trains the learning model for each image subgroup thereby to generate N discriminators each corresponding to the each image subgroup, and stores parameter information relating to the discriminators in the discriminator information storage unit 23. In this case, with reference to the training image storage unit 21 and the first correct answer data storage unit 22, the learning unit 16 performs the training of the learning model with respect to each image subgroup by using a set of training images belonging to the each image subgroup and the first correct answer data corresponding thereto. The learning model learned by the learning unit 16 is an arithmetic model configured to output, when an input image is inputted thereto, information indicating a position or an area of an annotation target in the input image. In this case, the learning model may be a learning model based on a neural network, and may be other types of learning models such as a support vector machine.

The discrimination unit 17 configures N discriminators for the image subgroups by referring to the discriminator information storage unit 23 and acquires the discrimination results by inputting the training images to the N discriminators. In this case, the discrimination unit 17 inputs each training image to the N−1 discriminators generated based on the image subgroups other than the image subgroup to which the each training image belongs. Thereby, the discrimination unit acquires N−1 discrimination results for each discriminator for each training image. Then, the discrimination unit 17 stores the N−1 discrimination results obtained for each training image in the discrimination result storage unit 24. In this case, the discrimination unit 17 stores, for example, each discrimination result in association with the identification information indicative of the corresponding training image and the identification information indicative of the discriminator used for acquiring the each discrimination result.

The second correct answer data generation unit 18 generates the second correct answer data C2 with respect to each training image by integrating the N−1 discrimination results by the discriminators stored in the discrimination result storage unit 24 with the first correct answer data stored in the first correct answer data storage unit 22. Specifically, provided that the discrimination results and the first correct answer data C1 indicates the coordinate value in the training image, the second correct answer data generation unit 18 calculates the X-coordinate and Y-coordinate of the second correct answer data C2 by averaging them with respect to the X-coordinate and the Y-coordinate, respectively. Further, when each of the discrimination results and the first correct answer data C1 is a binary image indicating the area of the annotation target, the second correct answer data generation unit 18 generates an image that is the second correct answer data C1 by averaging the pixel values with respect to each pixel. In this case, the second correct answer data generation unit 18 may convert the generated image into a binary image by providing a predetermined threshold value for each pixel of the generated image.

Instead of the averaging described above, the second correct answer data generation unit 18 may calculates a representative value (e.g., mode, median, and the like) other than the average value through statistical processing. For example, when each of the discrimination results and the first correct answer data C1 indicates the coordinate value in the training image, the second correct answer data generation unit 18 may calculate the X-coordinate and Y-coordinate of the second correct answer data C2 by calculating the representative value for the X-coordinate and Y-coordinate thereof.

Then, the second correct answer data generation unit 18 stores the second correct answer data C2 generated for each training image in the second correct answer data storage unit 25 in association with the identification information indicative of the corresponding training image. Then, the second correct answer data C2 stored in the second correct answer data storage unit 25 functions as training data together with the training image stored in the training image storage unit 21 and is suitably used for the training of the learning model.

(2) Specific Example

Figure 5:
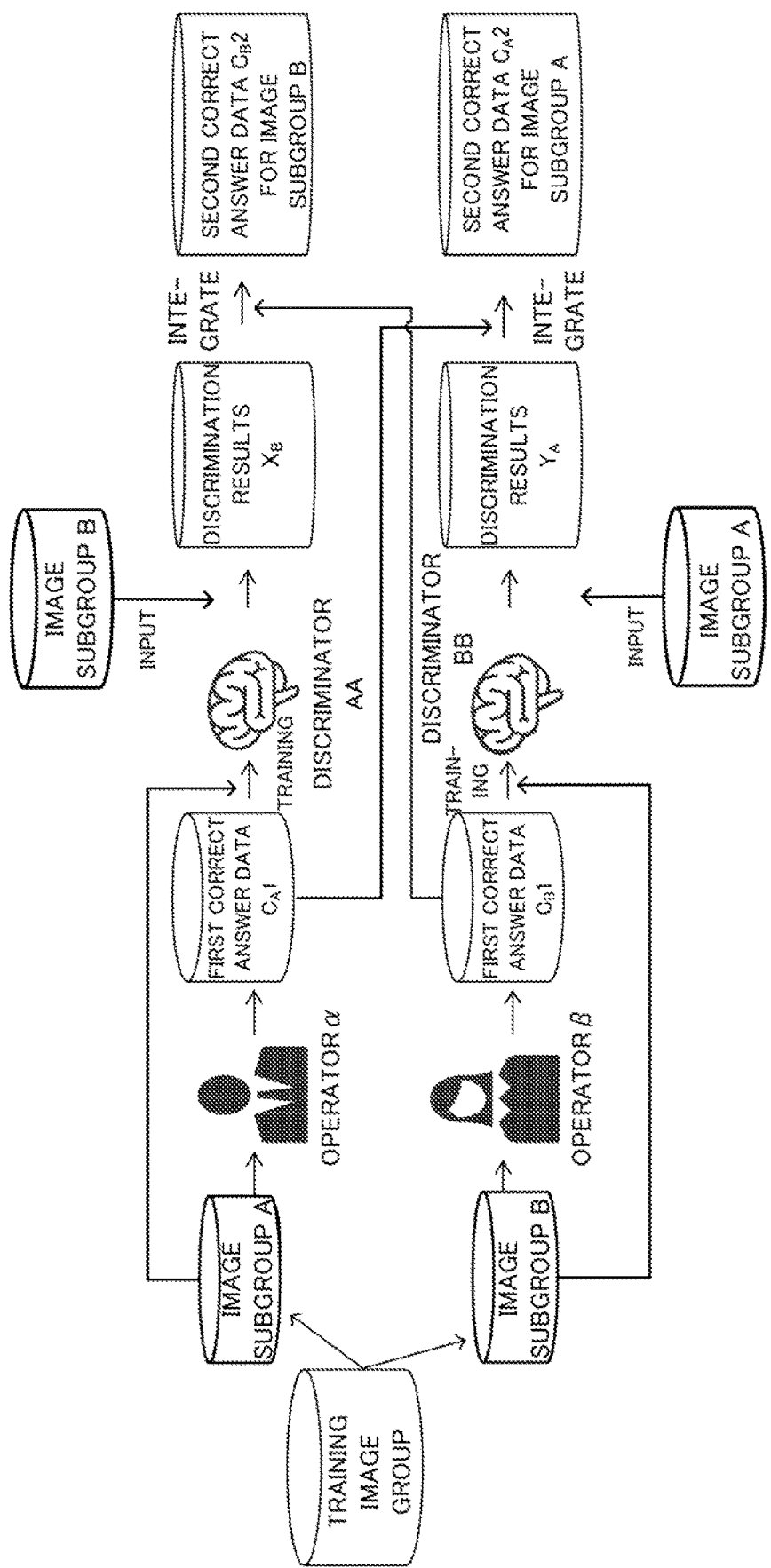
FIG. 5 illustrates an outline of the generation process of second correct answer data for each image subgroup.

FIG. 5 illustrates an outline of the generation process of the second correct answer data C2 for each image subgroup when N=2. Hereinafter, the generation process of the second correct answer data C2 shown in FIG. 5 will be described with reference to FIG. 4 illustrating the functional block.

In this case, the training image distribution unit 14 of the training data generation device 10 divides the training image group used for the training of the learning model into the image subgroup "A" and the image subgroup "B", wherein the learning model outputs the information indicative of the position or the area of the annotation target. Then, the training image distribution unit 14 transmits the request signals S1 each including a divided image subgroup to the two terminal devices 30. In the example of FIG. 5, the terminal device 30 which the operator "a" operates receives the request signal S1 including the image subgroup A, and generates first correct answer data "$C_A1$" for the image subgroup A. Further, the terminal device 30 which the operator "β" operates receives the request signal S1 including the image subgroup B, and generates the second correct answer data "$C_B1$" for the image subgroup B.

After the first correct answer data acquisition unit 15 receives the response signal S2 including the first correct answer data $C_A1$ and the response signal S2 including the second correct answer data $C_B1$, the learning unit 16 generates the discriminator "AA" based on the set of the first correct answer data $C_A1$ and the image subgroup A, and generates the discriminator "BB" based on the set of the first correct answer data $C_B1$ and the image subgroup B. The discrimination unit 17 acquires the discrimination results "$X_B$" for the training images of the image subgroup B by inputting, to the discriminator AA, each training image of the image subgroup B that is not used for the learning of the discriminator AA. Further, the discrimination unit 17 acquires the discrimination results "$Y_A$" for training images of the image subgroup A by inputting, to the discriminator BB, each training image of the image subgroup A that is not used for the learning of the discriminator BB.

The second correct answer data generation unit 18 integrates the discrimination results $X_B$ and the first correct answer data $C_B1$ to generate the second correct answer data "$C_B2$" for each training image of the image subgroup B. Further, the second correct answer data generation unit 18 generates the second correct answer data "$C_A2$" for each training image of the image subgroup A by integrating the discrimination results $Y_B$ and the first correct answer data $C_B1$.

Figure 6:
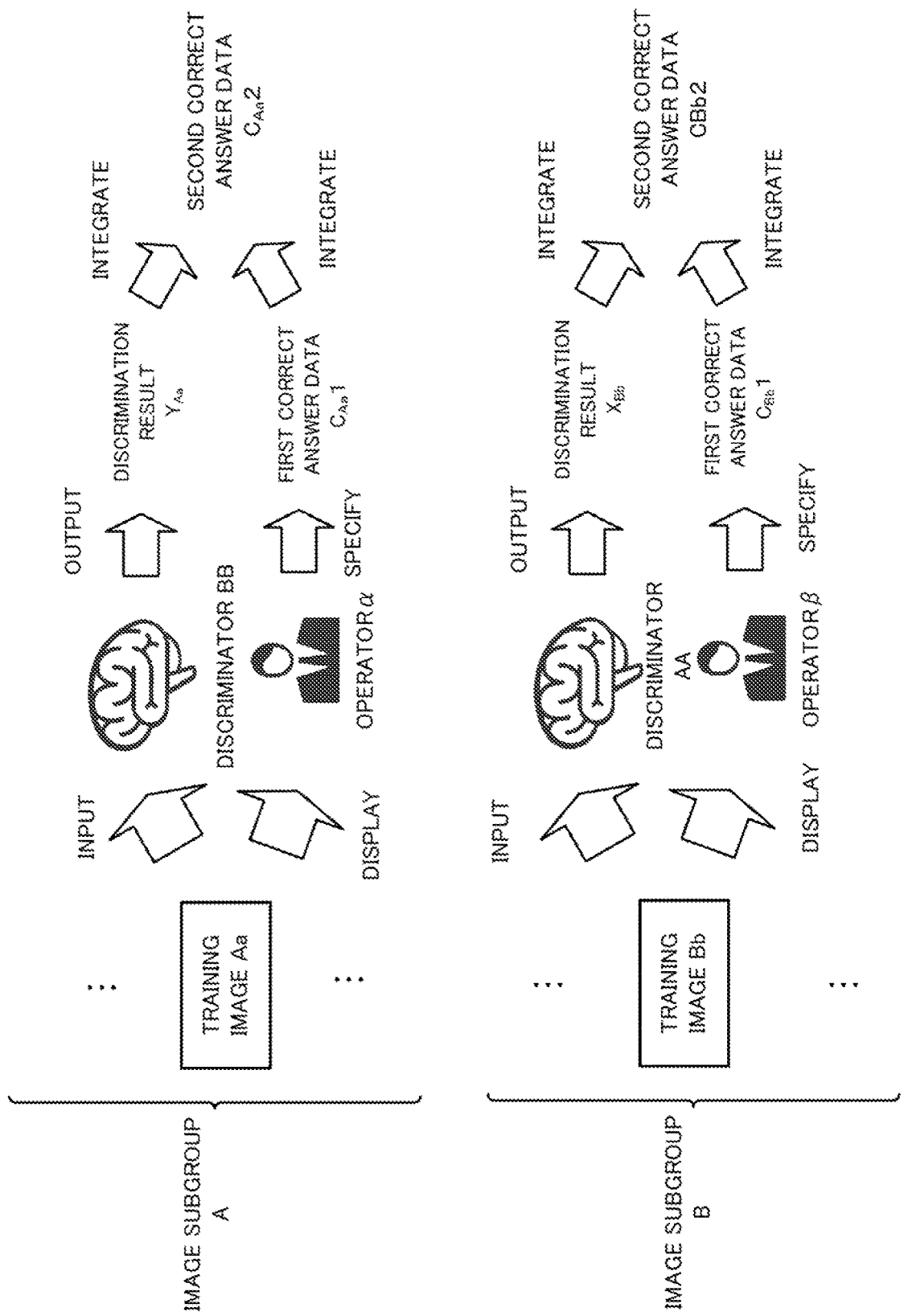
FIG. 6 illustrates the details of the process performed by the discrimination unit and the second correct answer data generation unit in the generation process of the second correct answer data shown in FIG. 5.

FIG. 6 illustrates a generation process of the second correct answer data shown in FIG. 5 for each training image. FIG. 6 illustrates a process of generating the second correct answer data "$C_{Aa}2$" for a training image "Aa" belonging to the image subgroup A and a process of generating the second correct answer data "$C_{Bb}2$" for a training image "Bb" belonging to the image subgroup B, respectively.

As shown in FIG. 6, after the learning by the learning unit 16, the discrimination unit 17 inputs the training image Aa belonging to the image subgroup A to the discriminator BB whose learning process does not use the training image Aa, thereby acquiring the discrimination result "$Y_{Aa}$". The first correct answer data "$C_{Aa}1$" for the training image Aa is generated based on the input of the operator α that specifies the position or the area of the annotation target through the terminal device 30 that displays the training image Aa. In this case, the second correct answer data generation unit 18 generates the second correct answer data $C_{Aa}2$ for the training image Aa by performing a process (e.g., averaging process) that integrates the discrimination result $Y_A$ for the training image Aa outputted by the discriminator BB with the first correct answer data $C_{Aa}1$ generated through the operation by the operator α.

Similarly, the discrimination unit 17 acquires the discrimination result "$X_{Bb}$" by inputting the training image Bb belonging to the image subgroup B into the discriminator AA whose learning process does not use the training image Bb. Further, the first correct answer data "$C_{Bb}1$" for the training image Bb is generated based on the input of the operator β that specifies the position or the area of the annotation target through the terminal device 30 that displays the training image Bb. In this case, the second correct answer data generation unit 18 generates the second correct answer data $C_{Bb}2$ for the training image Bb by performing a process (e.g., averaging process) that integrates the discrimination result $X_{Bb}$ for the training image Bb outputted by the discriminator AA with the first correct answer data $C_{Bb}1$ generated through the operation by the operator β.

(3) Process Flow

Figure 7:
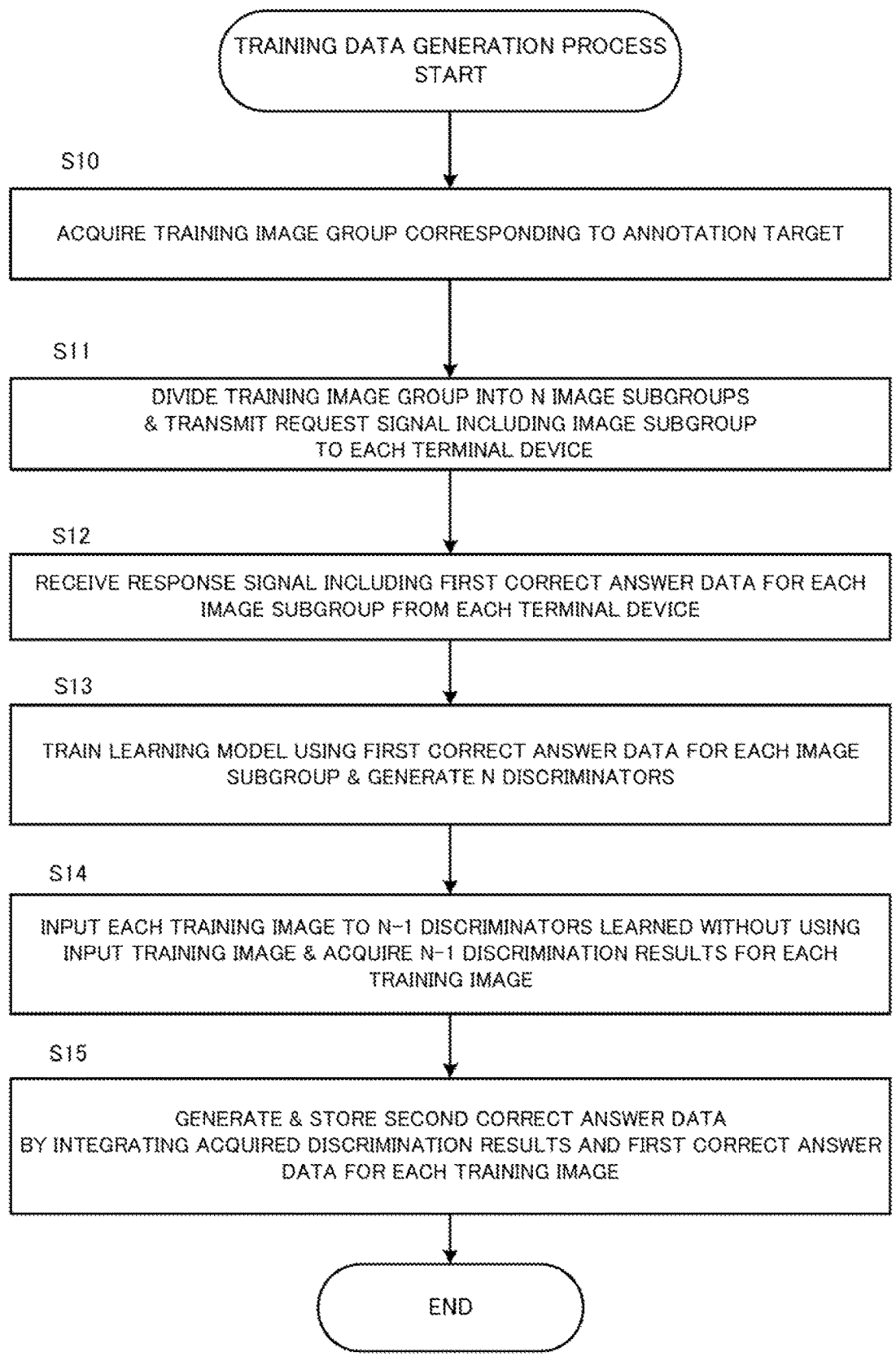
FIG. 7 illustrates an example of a flowchart showing the procedure of the correct answer data generation process.

FIG. 7 is an example of a flowchart showing the procedure of the correct answer data generation process in the present example embodiment. The training data generation device 10 executes processing of the flowchart shown in FIG. 7 for each type of the annotation target.

First, the training image distribution unit 14 of the training data generation device 10 acquires the training image group in which the annotation target is displayed from the training image storage unit 21 (Step S10). Then, the training image distribution unit 14 divides the acquired training image group into N image subgroups and transmits the request signals S1 each including an image subgroup divided for each of the N terminal devices 30 (Step S11).

Next, the first correct answer data acquisition unit 15 of the training data generation device 10 receives the response signal S2 including the first correct answer data C1 for each of the N divided image subgroups, from each terminal device 30 which has received the request signal S1 (step S12). Then, the first correct answer data acquisition unit 15 stores the first correct answer data C1 included in the response signal S2 received from each terminal device 30 in the first correct answer data storage unit 22.

Then, the learning unit 16 of the training data generation device 10 trains the learning model by using the first correct answer data C1 for each image subgroup and generates N discriminators (Step S13). Thereby, N discriminators corresponding respectively to N image subgroups are generated. Then, the learning unit 16 stores parameter information or the like relating to the N discriminators in the discriminator information storage unit 23.

Then, for each of the training images, the discrimination unit 17 of the training data generation device 10 inputs a training image to N−1 discriminators that have not used the above-mentioned training image for learning thereby to acquire N−1 discrimination results for each training image (Step 14). Then, the discrimination unit 17 stores the acquired discrimination results in the discrimination result storage unit 24.

Then, the second correct answer data generation unit 18 of the training data generation device 10 generates the second correct answer data C2 and stores it in the second correct answer data storage unit 25 by integrating the N−1 discrimination results obtained at step S14 with the first correct answer data C1 for each training image of interest based on a statistical technique such as averaging (step S15).

(4) Effect

Next, a supplementary description will be given of the effect according to the present example embodiment.

Generally, the accuracy of the discriminator obtained by learning greatly depends on the number of training data used for learning and the uniformity of the quality thereof. Therefore, it is necessary to acquire many training data having a uniform quality. On the other hand, when the operator carries out the annotation operation of the correct answer by one person, there is such an issue that it takes a lot of time because of the work alone, though the quality of the training data is kept uniform to some extent. In contrast, when plural operators perform the annotation work of the correct answer by sharing the work, it is possible to shorten the work time thanks to sharing the work among the operators. In this case, unfortunately, there is an issue that the variation in the quality of the training data occur due to the individual difference.

In view of the above, according to the present example embodiment, the second correct answer data C2 for each training image is generated through division of the training image group and the integration of the first correct answer data C1 and the discrimination result by the discriminator, which is learned based on the first correct answer data C1 generated through the input of the operator other than the operator which performs the annotation operation on the each training image. Thereby, it is possible to obtain the training data having a uniform quality without excessive influence by individual difference while shortening the work time by performing the annotation work by plural operators.

Next, a specific description will be given with reference to FIGS. 8A to 9B of the difference between the first correct answer data C1 and the second correct answer data C2.

Figure 8A:
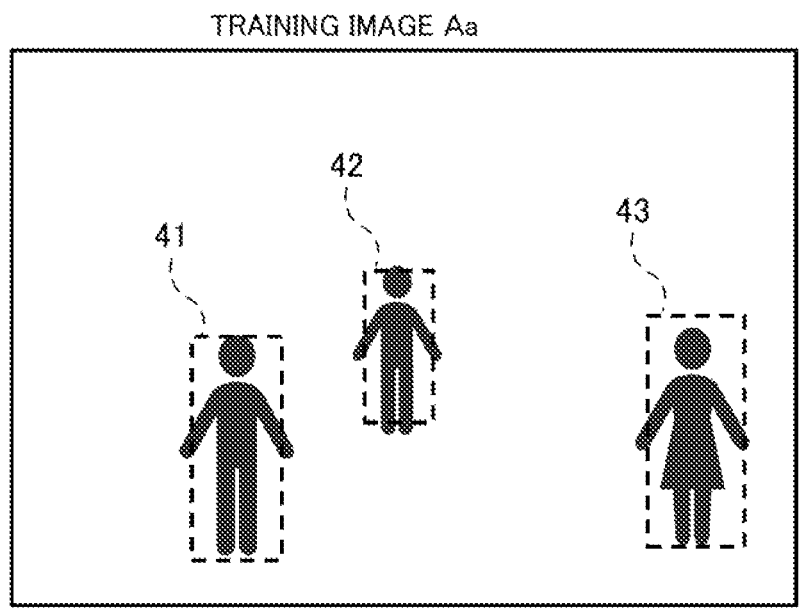
FIG. 8A illustrates a training image included in the image subgroup A.
Figure 8B:
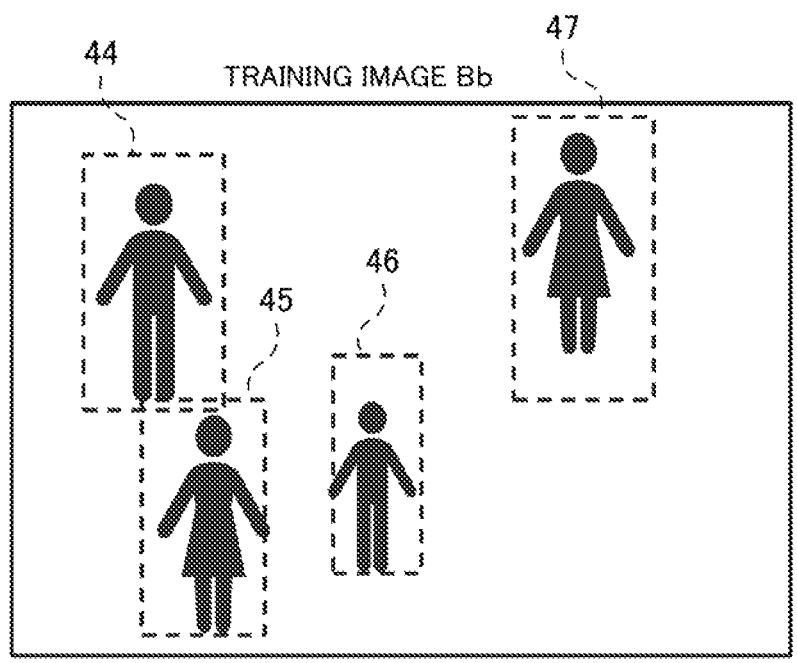
FIG. 8B illustrates a training image included in image subgroup B.

FIG. 8A illustrates a training image Aa included in the image subgroup A shown in FIG. 6, and FIG. 8B illustrates a training image Bb included in the image subgroup B shown in FIG. 6. Here, it is assumed that the human area is extracted as an area of the annotation target. The first correct areas 41 to 43 indicated by the broken-line rectangles shown in FIG. 8A indicate the areas of the annotation target which are specified based on the first correct answer data C1 (first correct answer data $C_{Aa}1$ in FIG. 6) specified based on the input by the operator α. The first correct areas 44 to 47 indicated by the broken-line rectangle shown in FIG. 8B indicates the areas of the annotation target which are specified based on the first correct answer data C1 (first correct answer data $C_{Bb}1$ in FIG. 6) specified based on the input by the operator β.

As shown in FIG. 8A, each of the first correct areas 41 to 43 set by the operator α is set to a relatively small rectangular area so as to be the smallest rectangular area surrounding each person. On the other hand, as shown in FIG. 8B, each of the first correct areas 44 to 47 set by the operator β is set to a relatively large rectangular area obtained by adding a margin to the human area so that the human area is reliably included in the rectangular area. In this way, the individual difference has occurred in the settings of the areas of the annotation target between the operator α and the operator β.

Figure 9A:
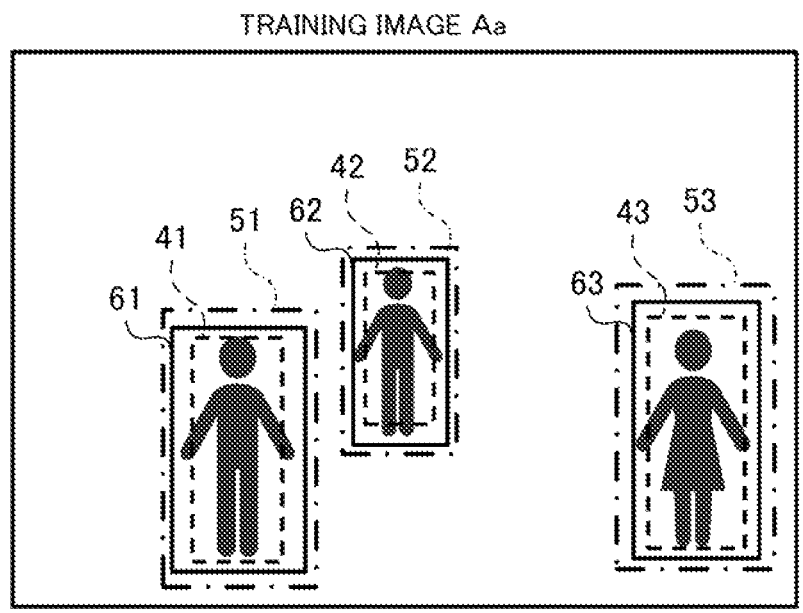
FIG. 9A illustrates a display example of the training image shown in FIG. 8A which clearly indicates areas according to the discrimination result and areas specified based on the second correct answer data.

FIG. 9A is a display example of the training image Aa in which the discrimination result areas 51 to 53 indicated by dash-dot-dash lines and the second correct answer areas 61 to 63 are explicitly indicated, wherein the discrimination result areas 51 to 53 are specified based on the discrimination result $Y_{Aa}$ when the training image Aa shown in FIG. 8A is inputted to the discriminator BB and the second correct answer areas 61 to 63 are specified based on the second correct answer data C2 (the second correct answer data $C_{Aa}2$ in FIG. 6).

as explained in FIGS. 5 and 6, the discriminator BB is learned based on the first correct answer data C1 (in FIG. 6, the first correct answer data $C_{Bb}1$) that is set by the operator β for the image subgroup B including the training image Bb shown in FIG. 8B. Therefore, the discrimination result areas 51 to 53 determined based on the discrimination result $Y_{Aa}$ outputted when the training image Aa is inputted to the discriminator BB are, as shown in FIG. 9A, a relatively large rectangular area that reflects the individuality of the annotation operation performed by the operator β. Therefore, the discrimination result areas 51 to 53 become larger areas than the first correct answer areas 41 to 43 set by the operator α, respectively.

On the other hand, the second correct answer data C2 (in FIG. 6, the second correct answer data $C_{Aa}2$) for the training image Aa is integrated data in which the discrimination result $Y_{Aa}$ by the discriminator BB is integrated through the averaging process or the like with the first correct answer data C1 (in FIG. 6, the first correct answer data $C_{Aa}1$) that is based on the input by the operator α. Therefore, the second correct areas 61 to 63 corresponding to the second correct answer data C2 is larger than the corresponding first correct areas 41 to 43 and smaller than the corresponding discrimination result areas 51 to 53, respectively. As a result, the second correct areas 61 to 63 surely include the target person.

Figure 9B:
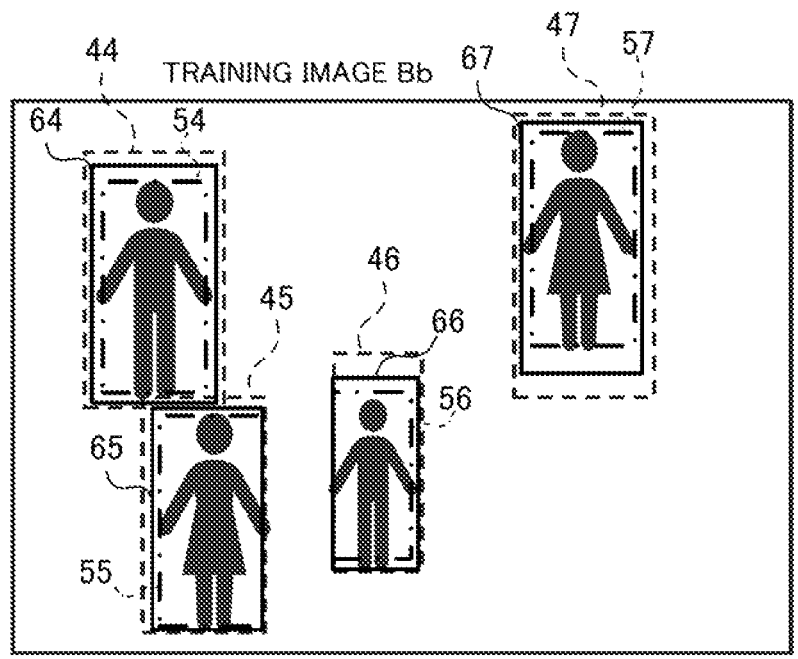
FIG. 9B illustrates a display example of the training image shown in FIG. 8B which clearly indicates areas according to the discrimination result and areas specified based on the second correct answer data.

FIG. 9B is a display example of a training image Bb in which the discrimination result areas 54 to 57 and the second correct answer areas 64 to 67 are explicitly indicated, wherein the discrimination result areas 54 to 57 are specified based on the discrimination result $X_{Bb}$ when the training image Bb shown in FIG. 8B is inputted to the discriminator AA and the second correct answer areas 64 to 67 are specified based on the second correct answer data C2 (the second correct answer data $C_{Bb}2$ in FIG. 6).

As explained in FIGS. 5 and 6, the discriminator AA is learned based on the first correct answer data C1 (in FIG. 6 the first correct answer data $C_{Aa}1$) which the operator α set for the image subgroup A including the training image Aa shown in FIG. 8B. Therefore, the discrimination result areas 54 to 57 according to the discrimination result $X_{Bb}$ outputted when the training image Bb is inputted to the discriminator AA becomes a relatively small rectangular area that reflects the individuality of the annotation operation performed by the operator α as shown in FIG. 9B. Therefore, the discrimination result areas 54 to 57 are larger than the first correct answer areas 44 to 47 set by the operator β, respectively.

In contrast, the second correct answer data C2 (in FIG. 6, the second correct answer data $C_{Bb}2$) for the training image Bb is integrated data in which the discrimination result $X_{Bb}$ by the discriminator AA is integrated with the first correct answer data C1 (in FIG. 6, the first correct answer data $C_{Bb}1$) generated based on the input of the operator β by averaging process or the like. Therefore, the second correct areas 64 to 67 corresponding to the second correct answer data C2 are smaller than the corresponding first correct areas 44 to 47 and lager than the corresponding discrimination result areas 54 to 57, respectively. As a result, the second correct areas 64 to 67 surely includes the target person.

Thus, even in the case that there is an individual difference in the setting of the area of the annotation target by the operator α and the operator β who share the annotation work regarding the training data group, the training data generation device 10 can suitably set the second answer data C2 having the uniform quality and absorbing the individual difference for each training image. Specifically, both of the second correct answer data C2 of each training image of the sub-learning group A which the operator α has performed the annotation operation and the second correct answer data C2 of each training image of the image subgroup B which the worker β has performed the annotation operation are data with a uniform quality in consideration of both of the individuality of the operator α and the individuality of the operator β.

MODIFICATION

Next, a description will be given of preferred modifications to the example embodiment described above. The modifications described below may be applied to the example embodiment described above in arbitrary combination.

First Modification

The discrimination unit 17 may further acquire, for each training image, the discrimination result by a discriminator (referred to as "additional discriminator") obtained by training the learning model without using the training data stored in the training image storage unit 21 and the first correct answer data storage unit 22. In this case, the second correct answer data generation unit 18 uses the discrimination result by the additional discriminator to generate the second correct answer data C2.

FIG. 10 illustrates a process of generating a second correct answer data $C_{Aa}2$ for the training image Aa according to the first modification in the example indicated by FIG. 5 and FIG. 6. In FIG. 10, the additional discriminator "SS" is a discriminator obtained by training the same learning model as the discriminator AA and the discriminator BB based on the training data which is a set of image groups other than the image subgroup A and the image subgroup B and corresponding correct answer data.

In this case, the training data generation device 10 acquires the discrimination result "$Z_{Aa}$" by inputting the training image Aa to the additional discriminator SS. The training data generation device 10 generates second correct answer data $C_{Aa}2$ by performing a process (e.g., averaging process) that integrates: the discrimination result $Z_{Aa}$ acquired from the additional discriminator SS; the discrimination result $Y_{Aa}$ outputted by the discriminator BB; and the first correct answer data $C_{Aa}1$ generated based on the annotation operation by the operator α.

In this way, according to the present modification, the training data generation device 10 further considers the discrimination result by the additional discriminator in which the learning is performed based on the training data other than the training data stored in the training image storage unit 21 and the first correct answer data storage unit 22 in order to calculate the second correct answer data C2. According to this mode, the training data generation device 10 can suitably acquire the training data with the uniform quality excluding the individuality in the annotation operation of the correct answer.

Second Modification

According to the above description relating to step S14 in FIG. 7, for each training image, the discrimination unit 17 acquires the discrimination results by the N−1 discriminators which are learned by use of the image subgroups other than the image subgroup to which the each training image belongs. Alternatively, when the number N is equal to or larger than three, for each training image, the discrimination unit 17 may acquire the discrimination result by the N−2 or less discriminators learned by the image subgroups other than the image subgroups to which the each training image belongs. In other words, for each training image, the discrimination unit 17 may acquire the discrimination result by at least one (i.e., 1 to N−1) discriminators learned by the image subgroups other than the image subgroups to which the each training image belongs.

For example, it is herein assumed that there are an image subgroup A, an image subgroup B and an image subgroup C and that the discriminators learned by the respective image subgroups are defined as the discriminator AA, the discriminator BB and the discriminator CC. In this case, the training data generation device 10 generates the second correct answer data C2 of a training image of the image subgroup A by integrating (e.g., averaging processing) the first correct answer data C1 for the training image with at least one of the discrimination result by the discriminator BB when the training image is inputted to the discriminator BB and the discrimination result by the discriminator CC when the training image is inputted to the discriminator CC. In the same way, the training data generation device 10 generates the second correct answer data C2 of a training image of the image subgroup B by using at least one of the discrimination result by the discriminator AA when the training image is inputted to the discriminator AA and the discrimination result by the discriminator CC when the training image is inputted to the discriminator CC. Furthermore, the training data generation device 10 generates the second correct answer data C2 of a training image of the image subgroup C by using at least one of the discrimination result by the discriminator AA when the training image is inputted to the discriminator AA and the discrimination result by the discriminator BB when the training image is inputted to the discriminator BB.

It is noted that the training data generation device 10 may select the discriminator to be used for generating the second correct answer data C2 at random or may select the discriminator based on a predetermined rule. Further, the training data generation device 10 may set the number of discrimination results to be used for generating the second correct answer data C2 to a predetermined number or to the number based on the user input.

According to this modification, the training data generation device 10 can also suitably generate second correct answer data C2 independent of the particular operator's individuality to perform the annotation operation of the correct answer.

Third Modification

The training data generation system 100 performs a process of distributing the image subgroup for each terminal device 30 to be used by the operator performing the annotation operation of the correct answer, respectively. However, the mode to which the present invention is applicable is not limited thereto.

For example, the training data generation device 10 may transmit the request signal S1 including the image subgroup to the same terminal device 30 at multiple times by different days or in different time slots. In this case, each time the terminal device 30 receives the request signal S1, the terminal device 30 generates a response signal S2 including the first correct answer data C1 for each training image of the image subgroup included in the request signal S1 based on the input of the operator, and transmits the response signal S2 to the training data generation device 10. Then, on the basis of step S13 in FIG. 7, the training data generation device 10 performs the learning of the discriminator for each image subgroup included in each request signal S1, then generates the second correct answer data C2 by performing the process at step S14 and step S15.

In this way, the training data generation device 10, generates the second correct answer data C2 by integrating the first correct answer data C1 with the discrimination result by the discriminator learned in the first correct answer data C1 generated in another date or time slot based on the same operator's operation. Thereby, it is possible to suitably generates the second correct answer data C2 having a uniform quality in consideration of the possibility of the variation in the quality of the first correct answer data generated by the same operator's annotation operation in different date or different time slot. In this example, the operator performing the annotation operation may be one person and the terminal device 30 may be only one.

In another example, the training data generation device 10 may determine the division number N of the image subgroup based on an attribute (e.g., age group, visual acuity, years of experience, a company where the operator belongs to) of the operator who performs the annotation operation of the correct answer.

As a first example, a description will be given of a case where the division number N of the image subgroups is determined according to the number of companies to which the operators belong. Provided that there are two companies (referred to as "v company" and "w company") to which the operators belong, the training data generation device 10 sets the division number N of the image subgroup to 2, and divides the training image registered in the training image storage unit 21 into two image subgroups for each type of the annotation target.

Figure 11:
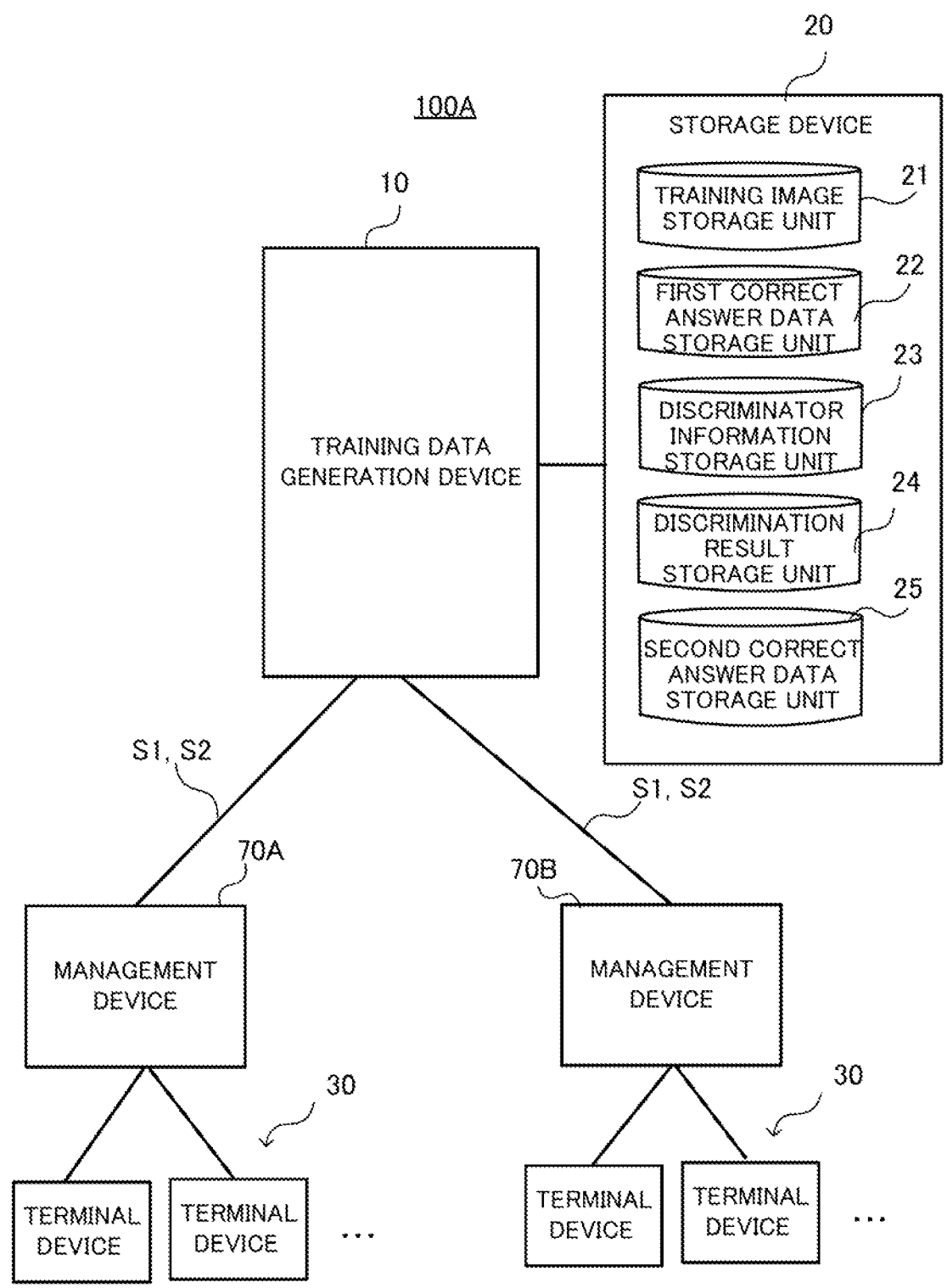
FIG. 11 illustrates the schematic configuration of the training data generation system in a third modification.

FIG. 11 illustrates a schematic configuration of a training data generation system 100A according the third modification. In the example of FIG. 11, the training data generation system 100A includes a management device 70A managed by the v company and a management device 70B managed by the w company. Each of the management devices 70A and 70B is connected to one or more terminal devices 30 each used by an employee of the company that is an operator of the annotation operation, respectively.

In this case, the training data generation device 10 transmits the request signal S1 including one image subgroup to the management device 70A, and transmits the request signal S1 including another image subgroup to the management device 70B. Then, each of the management devices 70A and 70B divides the image subgroup included in the request signal S1 according to the number of the terminal devices 30 used by the employees of the own company and transmits the images to the terminal devices 30. Then, as a response, each of the management devices 70A and 70B receives information relating to the first correct answer data C1 for the image subgroup from each terminal device 30. Then, each of the management devices 70A and 70B transmits the response signal S2 including the first correct answer data C1 collected from the terminal devices 30 to the training data generation device 10. The training data generation device 10 generates two discriminators by using a set of the image subgroup distributed to the v company and its first correct answer data C1 and a set of image subgroup distributed to the w company and its first correct answer data. Thereafter, the training data generation device 10 executes the same process as the process at step S14 and step S15 in FIG. 7 thereby to generate the second correct answer data C2 for each training image.

As a second example, a description will be given of the case of determining the division number N of the image subgroups according to the age groups of the operators. For example, when the training image group is divided into two image subgroups corresponding to the first age group and the second age group, the training data generation device 10 recognizes the number of operators belonging to the first age group and the number of operators belonging to the second age group, respectively, and further divides each image subgroup according to the number of operators in each age group. In this case, for example, the training data generation device 10 stores in advance the attribute information including the age information relating to each operator α nd the communication address information relating to the terminal device 30 used by each operator in the memory 12 or the like. Then, the training data generation device 10 transmits the request signal S1 including an image subgroup to each terminal device 30 used by each operator, and receives the response signal S2 from the each terminal device 30 that are the transmission destinations. Thereafter, the training data generation device 10 generates two discriminators using a set of the image subgroup distributed to the first age group and its first correct answer data C1, and a set of the image subgroup distributed to the second age group and its first correct answer data C1. Thereafter, the training data generation device 10 generates the second correct answer data C2 by executing the same processing as at step S14 and step S15 in FIG. 7.

Thus, even by determining the division number N of the image subgroup on the basis of a particular attribute such as the age group of the operator, the gender and the company to which the operator belongs, it is possible to generate a second correct answer data C2 whose variations in quality due to the individual difference in specific attributes is suitably reduced.

Fourth Modification

The configuration of the training data generation system 100 shown in FIG. 1 is an example, and the configuration to which the present invention can be applied is not limited thereto.

For example, the training data generation device 10 may be configured by plural devices. For example, the training data generation device 10 may include a device having the function of the training image distribution unit 14, a device having the function of the first correct answer data acquisition unit 15, a device having the function of the learning unit 16, a device having the function of the discrimination unit 17 and a device having the function of the second correct answer data generation unit 18. In this case, each of these devices exchanges information necessary for each device to execute a predetermined allocated processing with another device.

Fifth Modification

The Training data generation device 10 may further calculate an evaluation value for the operator of the terminal device 30 that generates the first correct answer data C1 based on the difference between the second correct answer data C2 and the first correct answer data C1 generated for each training image. In this case, the training data generation device 10 may reflect the evaluation value in the distribution amount (i.e., the number of images of the image subgroup) of the training images in which each operator will deal with in the annotation operation next time.

Figure 12:
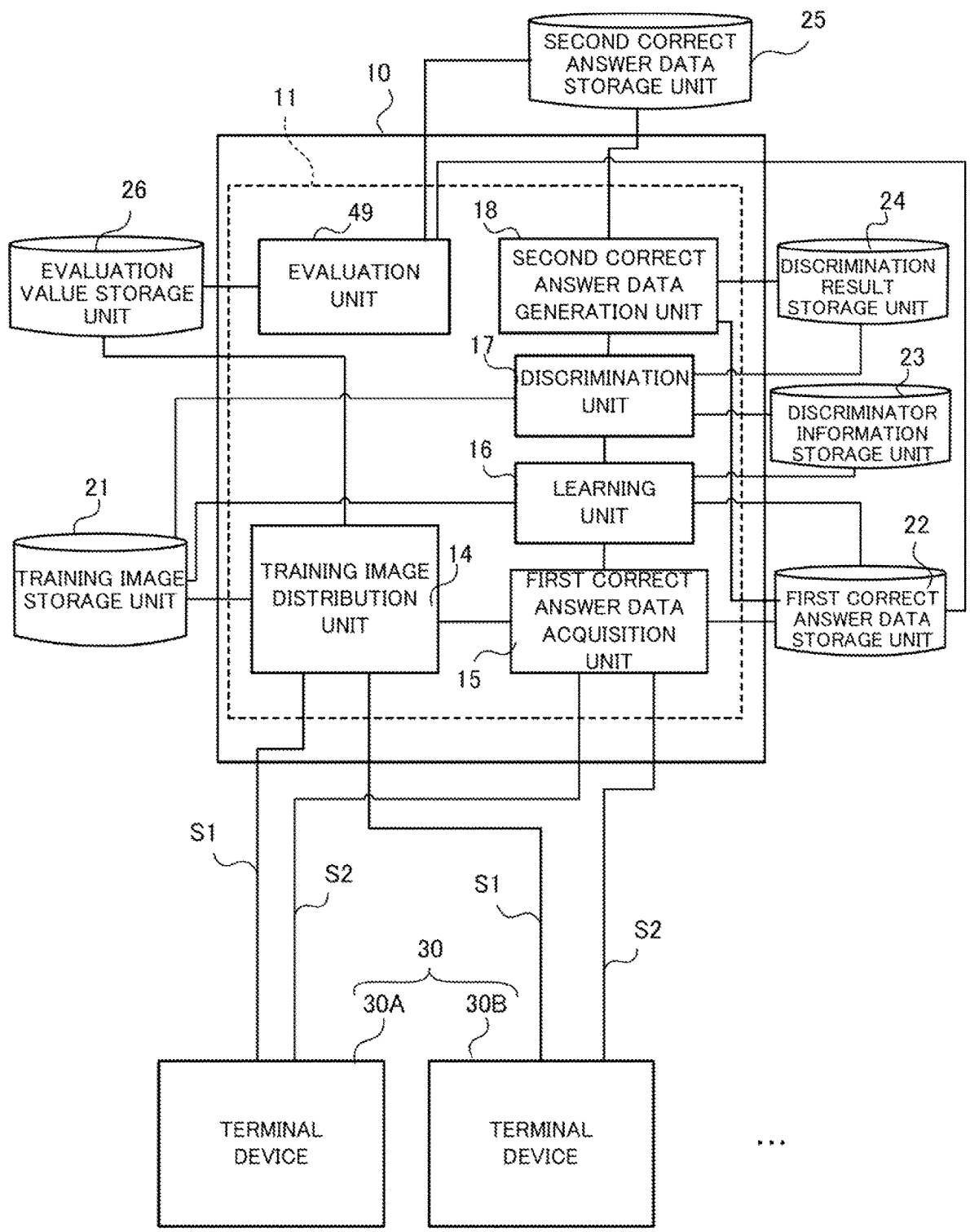
FIG. 12 illustrates a functional block diagram of the training data generation device according to a fifth modification.

FIG. 12 illustrates a functional block of the training data generation device 10 according to the fifth modification. In the example of FIG. 12, the storage device 20 includes an evaluation value storage unit 26 for storing an evaluation value for each operator. Further, the first correct answer data storage unit 22 includes the first correct answer data C1 in association with the identification information indicative of the operator performing the annotation operation of the first correct answer data C1.

Further, the training data generation device 10 includes an evaluation unit 49. The evaluation unit 49 calculates, for each operator, a representative value (e.g., an average value) of the difference between the first correct answer data C1 and the second correct answer data C1 of each training image by referring to the first correct answer data storage unit 22 and the second correct answer data storage unit 25. Then, the evaluation unit 49 calculates the evaluation value of each operator based on the calculated representative value of the difference, and stores the calculated evaluation value in the evaluation value storage unit 26. In this case, for example, according to the calculation formula or the like determined in advance, the evaluation unit 49 determines the evaluation value so that the evaluation value increases with the decrease in the calculated representative value.

Then, when the subsequent transmission process of the request signal S1 is performed, the training image distribution unit 14 recognizes the evaluation value of the operator corresponding to the terminal device 30 that is the transmission destination of the request signal S1 by referring to the evaluation value storage unit 26. Then, the training image distribution unit 14 increases the number of images of the image subgroup to be included in the request signal S1 to be transmitted with an increase in the evaluation value of the terminal device 30 of the operator. For example, in this case, for the terminal device 30 of the operator having the highest evaluation value, the training image distribution unit 14 sets the number of images of the image subgroup to be included in the request signal S1 to the number larger by a predetermined ratio than the number when evenly distributed. In contrast, for the terminal device 30 of the operator having the lowest evaluation value, the training image distribution unit 14 sets the number of images of the image subgroup to be included in the request signal S1 to the number smaller by a predetermined ratio than the number when evenly distributed.

According to this mode, the training data generation device 10 can suitably perform evaluation for the operator which performs the annotation operation, and therefore, for example, can intentionally reduce the number of images of the training image to be distributed to the operator having a history of a large number of work errors. Thus, the training data generation device 10 can generate the second correct answer data C2 with higher accuracy.

Sixth Modification

The training data generation device 10 may not have a function corresponding to the training image distribution unit 14.

Figure 13:
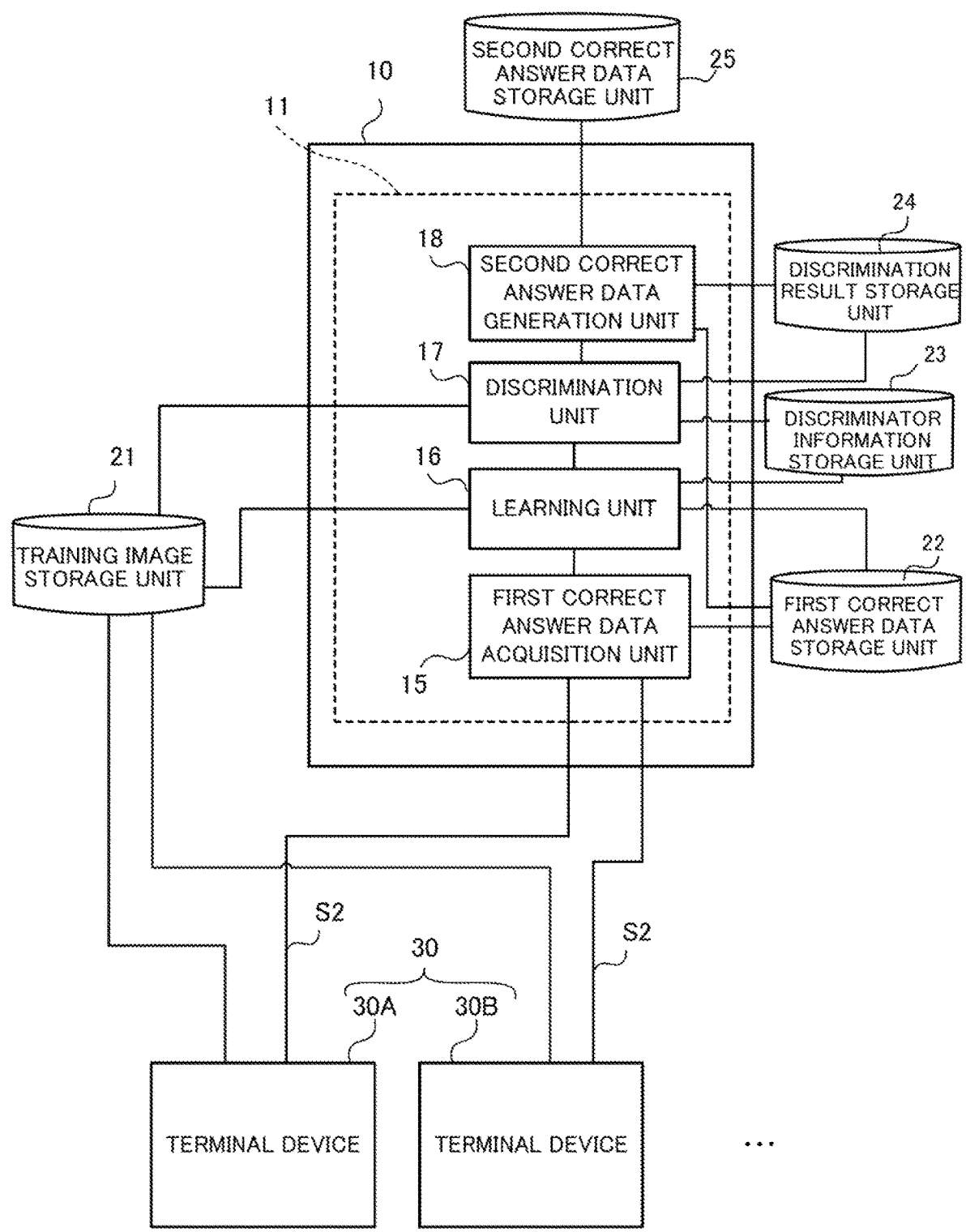
FIG. 13 illustrates a functional block diagram of a training data generation device according to a sixth modification.

FIG. 13 is a functional block diagram of the training data generation device 10 according to the sixth modification. In the example of FIG. 13, instead of the training image distribution unit 14 transmitting the request signal S1 including the image subgroup to each terminal device 30, each terminal device 30 refers to the training image storage unit 21 and acquires the image subgroup to be given the first correct answer data. In this case, for example, by referring to a predetermined URL or the like notified in advance, the terminal device 30 acquires from the training image storage unit 21 the image subgroup to be acquired. Then, the terminal device 30 displays each training image of the image subgroup acquired from the training image storage unit 21 and then generates first correct answer data C1 by receiving an input by the operator. Then, the terminal device 30 transmits the response signal S2 including the first correct answer data C1 to the training data generation device 10.

The whole or a part of the example embodiments described above (including modifications, the same applies hereinafter) can be described as, but not limited to, the following Supplementary Notes.

[Supplementary Note 1]

A generation method executed by a training data generation device, comprising:
acquiring first correct answer data that is correct answer data with respect to each training image of a training image group, the training image group including plural training images to be given the correct answer data, the training image group being divided into plural image subgroups, the first correct answer data being generated in a different situation for each of the plural image subgroups;
generating a discriminator with respect to the each of the plural image subgroups, the discriminator being learned based on the each of the plural image subgroups and the first correct answer data corresponding to the each of the plural image subgroups;
acquiring a discrimination result outputted by the discriminator for each of the plural training images by inputting the each of the plural training images to the discriminator which is generated based on at least one image subgroup other than an image subgroup to which the each of the training images belongs; and
generating second correct answer data for the each of the plural training images based on the discrimination result and the first correct answer data.

[Supplementary Note 2]

The generation method according to Supplementary Note 1, wherein the acquiring the discrimination result is acquiring the discrimination result outputted by the discriminator for the each of the plural training images by inputting the each of the plural training images to the discriminator which is generated based on each of the plural image subgroups other than the image subgroup to which the each of the plural training images belongs.

[Supplementary Note 3]

The generation method according to Supplementary Note 1 or 2,
wherein the second correct answer data is data indicative of a representative value calculated based on a value indicated by the discrimination result and a value indicated by the first correct answer data.

[Supplementary Note 4]

The generation method according to any one of Supplementary Notes 1 to 3,
wherein the acquiring the discrimination result is acquiring, for the each of the plural training images, a first discrimination result outputted by the discriminator generated based on the at least one image subgroup and a second discrimination result outputted by a discriminator learned based on training data which does not includes the plural image subgroups, and wherein the generating the second correct answer data is generating the second correct answer for the each of the plural training images based on the first discrimination result, the second discrimination result and the first correct answer data.

[Supplementary Note 5]

The generation method according to any one of Supplementary Notes 1 to 4, wherein the different situation for the each of the plural image subgroups is at least one of a situation in which an operator which performs an input relating to the first correct answer data is different depending on the each of the plural image subgroups, a situation in which an attribute of the operator which performs an input relating to the first correct answer data is different depending on the each of the plural image subgroups, a situation a date or a time slot when an input relating to the first correct answer data is performed is different.

[Supplementary Note 6]

The generation method according to any one of Supplementary Notes 1 to 5, wherein the acquiring the first correct answer data is receiving the first correct answer data for the each of the plural image subgroups from a terminal device by transmitting the each of the plural image subgroup to the terminal device.

[Supplementary Note 7]

The generation method according to any one of Supplementary Notes 1 to 6, wherein the acquiring the first correct answer data is dividing the training image group so that each of the plural image subgroup has an equal number of training images with respect to each target of annotation of the correct answer.

[Supplementary Note 8]

The generation method according to any one of Supplementary Notes 1 to 6, wherein the acquiring the first correct answer data includes determining the number of the training images to be included in the each of the plural image subgroup based on an evaluation value for an operator which performs an input relating to the first correct answer data with respect to the each of the plural image subgroup.

[Supplementary Note 9]

The generation method according to Supplementary Note 8, further comprising determining the evaluation value for the operator which performs the input relating to the first correct answer data based on a difference between the second correct answer data and the first correct answer data.

[Supplementary Note 10]

A training data generation device comprising:

a first correct answer data acquisition unit configured to acquire first correct answer data that is correct answer data with respect to each training image of a training image group, the training image group including plural training images to be given the correct answer data, the training image group being divided into plural image subgroups, the first correct answer data being generated in a different situation for each of the plural image subgroups;

a learning unit configured to generate a discriminator with respect to the each of the plural image subgroups, the discriminator being learned based on the each of the plural image subgroups and the first correct answer data corresponding to the each of the plural image subgroups;

a discrimination unit configured to acquire a discrimination result outputted by the discriminator for each of the plural training images by inputting the each of the plural training images to the discriminator which is generated based on at least one image subgroup other than an image subgroup to which the each of the training images belongs; and a second correct answer data generation unit configured to generate second correct answer data for the each of the plural training images based on the discrimination result and the first correct answer data.

[Supplementary Note 11]

A program executed by a computer, the program causing the computer to function as:

a first correct answer data acquisition unit configured to acquire first correct answer data that is correct answer data with respect to each training image of a training image group, the training image group including plural training images to be given the correct answer data, the training image group being divided into plural image subgroups, the first correct answer data being generated in a different situation for each of the plural image subgroups;

a learning unit configured to generate a discriminator with respect to the each of the plural image subgroups, the discriminator being learned based on the each of the plural image subgroups and the first correct answer data corresponding to the each of the plural image subgroups;

a discrimination unit configured to acquire a discrimination result outputted by the discriminator for each of the plural training images by inputting the each of the plural training images to the discriminator which is generated based on at least one image subgroup other than an image subgroup to which the each of the training images belongs; and a second correct answer data generation unit configured to generate second correct answer data for the each of the plural training images based on the discrimination result and the first correct answer data.

While the invention has been particularly shown and described with reference to example embodiments thereof, the invention is not limited to these embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent Literatures mentioned in this specification are incorporated by reference in its entirety.

DESCRIPTION OF REFERENCE NUMERALS

10 Training data generation device
11, 31 Processor 12,32 Memory
13, 33 Interface
20 Storage device
21 Training image storage unit
22 First correct answer data storage unit
23 Discriminator information storage unit
24 Discrimination result storage unit
25 Second correct answer data storage unit
30 Terminal device
100, 100A Training data generation system

What is claimed is:

1. A generation method executed by a training data generation device, comprising:
acquiring first correct answer data that is correct answer data with respect to each training image of a training image group, the training image group including plural training images to be given the correct answer data, the training image group being divided into plural image subgroups, the first correct answer data being generated in a different situation for each of the plural image subgroups;
generating a discriminator with respect to the each of the plural image subgroups, the discriminator being learned based on the each of the plural image subgroups and the first correct answer data corresponding to the each of the plural image subgroups;
acquiring a discrimination result outputted by the discriminator for each of the plural training images by inputting the each of the plural training images to the discriminator which is generated based on at least one image subgroup other than an image subgroup to which the each of the training images belongs; and
generating second correct answer data for the each of the plural training images based on the discrimination result and the first correct answer data.

2. The generation method according to claim 1,
wherein the acquiring the discrimination result is acquiring the discrimination result outputted by the discriminator for the each of the plural training images by inputting the each of the plural training images to the discriminator which is generated based on each of the plural image subgroups other than the image subgroup to which the each of the plural training images belongs.

3. The generation method according to claim 1,
wherein the second correct answer data is data indicative of a representative value calculated based on a value indicated by the discrimination result and a value indicated by the first correct answer data.

4. The generation method according to claim 1,
wherein the acquiring the discrimination result is acquiring, for the each of the plural training images, a first discrimination result outputted by the discriminator generated based on the at least one image subgroup and a second discrimination result outputted by a discriminator learned based on training data which does not includes the plural image subgroups, and
wherein the generating the second correct answer data is generating the second correct answer for the each of the plural training images based on the first discrimination result, the second discrimination result and the first correct answer data.

5. The generation method according to claim 1,
wherein the different situation for the each of the plural image subgroups is at least one of
a situation in which an operator which performs an input relating to the first correct answer data is different depending on the each of the plural image subgroups,
a situation in which an attribute of the operator which performs an input relating to the first correct answer data is different depending on the each of the plural image subgroups,
a situation in which a date or a time slot when an input relating to the first correct answer data is performed is different.

6. The generation method according to claim 1,
wherein the acquiring the first correct answer data is receiving the first correct answer data for the each of the plural image subgroups from a terminal device by transmitting the each of the plural image subgroup to the terminal device.

7. The generation method according to claim 1,
wherein the acquiring the first correct answer data is dividing the training image group so that each of the plural image subgroup has an equal number of training images with respect to each target of annotation of the correct answer.

8. The generation method according to claim 1,
wherein the acquiring the first correct answer data includes determining the number of the training images to be included in the each of the plural image subgroup based on an evaluation value for an operator which performs an input relating to the first correct answer data with respect to the each of the plural image subgroup.

9. The generation method according to claim 8, further comprising
determining the evaluation value for the operator which performs the input relating to the first correct answer data based on a difference between the second correct answer data and the first correct answer data.

10. A training data generation device comprising: comprising
a processor configured to:
acquire first correct answer data that is correct answer data with respect to each training image of a training image group, the training image group including plural training images to be given the correct answer data, the training image group being divided into plural image subgroups, the first correct answer data being generated in a different situation for each of the plural image subgroups;
generate a discriminator with respect to the each of the plural image subgroups, the discriminator being learned based on the each of the plural image subgroups and the first correct answer data corresponding to the each of the plural image subgroups;
acquire a discrimination result outputted by the discriminator for each of the plural training images by inputting the each of the plural training images to the discriminator which is generated based on at least one image subgroup other than an image subgroup to which the each of the training images belongs; and
generate second correct answer data for the each of the plural training images based on the discrimination result and the first correct answer data.

11. A non-transitory computer readable medium including a A-program executed by a computer, the program causing the computer to:
acquire first correct answer data that is correct answer data with respect to each training image of a training image group, the training image group including plural training images to be given the correct answer data, the training image group being divided into plural image subgroups, the first correct answer data being generated in a different situation for each of the plural image subgroups;

generate a discriminator with respect to the each of the plural image subgroups, the discriminator being learned based on the each of the plural image subgroups and the first correct answer data corresponding to the each of the plural image subgroups;

acquire a discrimination result outputted by the discriminator for each of the plural training images by inputting the each of the plural training images to the discriminator which is generated based on at least one image subgroup other than an image subgroup to which the each of the training images belongs; and generate second correct answer data for the each of the plural training images based on the discrimination result and the first correct answer data.

12. The training data generation device according to claim 10, wherein the processor is configured to acquire the discrimination result outputted by the discriminator for the each of the plural training images by inputting the each of the plural training images to the discriminator which is generated based on each of the plural image subgroups other than the image subgroup to which the each of the plural training images belongs.

13. The training data generation device according to claim 10, wherein the second correct answer data is data indicative of a representative value calculated based on a value indicated by the discrimination result and a value indicated by the first correct answer data.

14. The training data generation device according to claim 10, wherein the processor is configured to acquire, for the each of the plural training images, a first discrimination result outputted by the discriminator generated based on the at least one image subgroup and a second discrimination result outputted by a discriminator learned based on training data which does not includes the plural image subgroups, and wherein the processor generates the second correct answer for the each of the plural training images based on the first discrimination result, the second discrimination result and the first correct answer data.

15. The training data generation device according to claim 10, wherein the different situation for the each of the plural image subgroups is at least one of a situation in which an operator which performs an input relating to the first correct answer data is different depending on the each of the plural image subgroups, a situation in which an attribute of the operator which performs an input relating to the first correct answer data is different depending on the each of the plural image subgroups, a situation in which a date or a time slot when an input relating to the first correct answer data is performed is different.

16. The training data generation device according to claim 10, wherein the processor is configured to receive the first correct answer data for the each of the plural image subgroups from a terminal device by transmitting the each of the plural image subgroup to the terminal device.

17. The training data generation device according to claim 10, wherein the processor is configured to divide the training image group so that each of the plural image subgroup has an equal number of training images with respect to each target of annotation of the correct answer.

18. The training data generation device according to claim 10, wherein the processor is configured to determine the number of the training images to be included in the each of the plural image subgroup based on an evaluation value for an operator which performs an input relating to the first correct answer data with respect to the each of the plural image subgroup.

19. The training data generation device according to claim 18, wherein the processor is further configured to determine the evaluation value for the operator which performs the input relating to the first correct answer data based on a difference between the second correct answer data and the first correct answer data.

* * * * *